United States Patent [19]

He et al.

[11] Patent Number: 4,658,827

[45] Date of Patent: Apr. 21, 1987

[54] ULTRASOUND SCANNER FOR TISSUE CHARACTERIZATION

[75] Inventors: Ping He; James F. Greenleaf, both of Rochester, Minn.

[73] Assignee: Mayo Medical Resources, Rochester, Minn.

[21] Appl. No.: 740,178

[22] Filed: May 31, 1985

[51] Int. Cl.$^4$ ............................................. A61B 10/00
[52] U.S. Cl. ...................................... 128/660; 73/599; 73/631
[58] Field of Search ................... 128/660; 73/599, 631; 364/415

[56] References Cited

PUBLICATIONS

"Ultrasonic Tissue Characterization: A Review," by J. P. Jones et al., in *Acta Electronica*, vol. 26, Nos. 1-2, 1984.

"Ultrasonic Characterization of Abdominal Tissues via Digital Analysis of Backscattered Waveforms," by F. Graham Sommer, M.D., et al., in *Radiology*, vol. 141, No. 3, pp. 811-817, Dec. 1981.

"Measurement of Ultrasonic Attenuation Within Regions Selected from B-Scan Images," by Kevin J. Parker et al., in *IEEE Transactions on Biomedical Engineering*, (vol. BME-30, No. 8, Aug. 1983).

"A Narrowband Pulse-Echo Technique for In Vivo Ultrasonic Attenuation Estimation," by J. Ophir et al., in *IEEE Transactions on Biomedical Engineering*, vol. BME-32, No. 3, Mar. 1985.

"Attenuation Estimation in Reflection: Progress and Prospects," by J. Ophir et al., in *Ultrasonic Imaging* 6, pp. 349-395, 1984.

"Spectral Characterization and Attenuation Measurements in Ultrasound," by S. W. Flax et al., in *Ultrasonic Imaging* 5, pp. 95-116, 1983.

"Clinical Application of an Ultrasound Attenuation Coefficient Estimation Technique for Liver Pathology Characterization," by R. Kuc, in *IEEE Transactions on Biomedical Engineering*, vol. BME-27, No. 6, Jun. 1980.

*Primary Examiner*—Kyle L. Howell
*Assistant Examiner*—Francis J. Jaworski
*Attorney, Agent, or Firm*—Merchant, Gould, Smith, Edell, Welter & Schmidt

[57] ABSTRACT

Both the linear attenuation coefficient and an index describing the heterogeneity of the scatterers of tissue can be obtained simultaneously by the method and system disclosed herein. The system also produces a B-scan image with optimal time-variable gain compensation. The system combines an envelope peak method with a conventional ultrasound pulse-echo scanner. In this method, the peaks of the echo envelopes in a B-scan are multiplied by a controllable gain function. By adjusting the parameter of the gain function, the noise-to-signal ratio (NSR) of the envelope peaks is minimized. The minimum NSR can be used as an index to describe the heterogeneity of the tissue scatterers and the parameter of the gain function corresponding to the minimum NSR is equal to the attenuation coefficient of the tissue.

14 Claims, 8 Drawing Figures

ULTRASOUND SCANNER FOR TISSUE CHARACTERIZATION

FIELD OF THE INVENTION

This invention relates to tissue characterization by ultrasound B-scan techniques, and in particular, discloses a new method which uses the values of the peaks of the echo envelopes to estimate the attenuation coefficient and the heterogeneity of the tissue scatterers.

BACKGROUND OF THE PRIOR ART

It has been observed that many diseases are accompanied by notable changes in the ultrasound characteristics of the tissue. Kuc found that a cirrhotic liver has a higher attenuation coefficient (see "Clinical Application of an Ultrasound Attenuation Coefficient Estimation Technique for Liver Pathology Characterization" by R. Kuc, in *IEEE Transactions on Biomedical Engineering* BME-27:312–319, 1980). Sommer et al. reported that the variance of the echo amplitudes is increased in fibrotic or fatty livers (see "Ultrasonic Characterization of Abdominal Tissues via Digital Analysis of Backscattered Waveforms" by F. G. Sommer et al., in *Radiology* 141:811–817, 1981). Therefore, quantitative measurements of these tissue parameters can provide an important modality of noninvasive diagnosis.

Various methods for estimating the attenuation coefficient of tissues have been reported. Some of them are simple, but are not accurate. Most of them require complicated signal processing and therefore are difficult to perform in real time. It has also been realized that in order to define a disease state of the tissue, measurements of several parameters, instead of just one parameter, are often necessary.

SUMMARY OF THE INVENTION

To overcome these and other problems in the prior art, this invention provides an improved method and system for providing tissue characterization, noninvasively, through ultrasonic scanning. According to one aspect of the invention, a method and system are provided for simultaneously obtaining accurate estimates of the attenuation coefficient of the tissue and an index describing the heterogeneity of the scatterers within the tissue. According to preferred embodiments of the invention, these measurements can be made accurately and automatically, in real time.

According to the invention, there is provided a method and apparatus for tissue characterization by transmitting ultrasonic energy into the sample tissue, and receiving and processing return echo signals. The received signals are multiplied by a time variable gain function and envelope and peak detected. The noise-to-signal ratio of the envelope peaks is calculated, and if necessary the process is repeated with a different variable gain factor until a minimum noise-to-signal measurement is obtained. The noise-to-signal ratio provides a measure of the heterogeneity of the scattering within the tissue, and the final value of the time variable gain provides a measure of the attenuation coefficient within the tissue.

According to different embodiments of the invention, the various steps can be accomplished through analog means, digital means, or a combination. According to another aspect of the invention, compensation can be provided to correct for beam pattern diffraction.

According to a specific application of the invention, a method and apparatus is provided for liver ultrasound diagnosis, which is quick, accurate, and requires little training to operate.

DETAILED DESCRIPTION OF THE PREFERRED EMBODIMENTS

Figure 1:
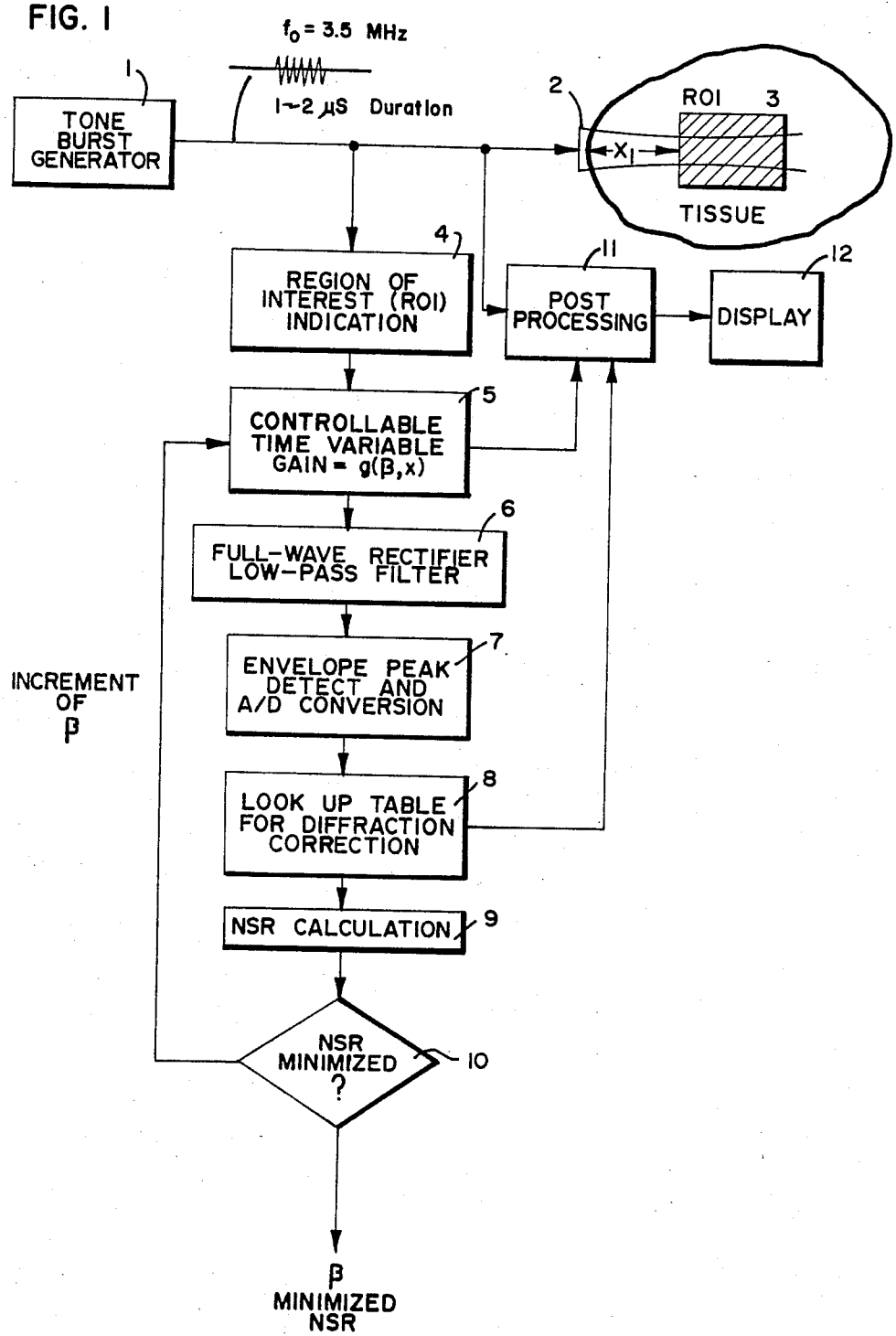
FIG. 1 is a block diagram of one embodiment of the invention in which a narrowband ultrasound signal is used and most of the analysis is done in analog.

FIG. 1 shows a block diagram of the one embodiment of the invention which uses a narrowband tone-burst signal, and in which the main part of the signal processing is done by analog hardware. Therefore, the system is simple and the response of the system is very fast. A tone-burst signal with central frequency $f_o$ is generated by the generator 1 and transmitted and received by a sector scanning transducer 2. The region of interest 3 within the body or tissue is determined by 4 by controlling the gating of the received echo signals. The region of interest is selected to represent a part of the tissue having the same characteristics, i.e., all liver in the left lobe. The start distance of the region of interest is $x_1$.

Gated echoes are multiplied by a controllable gain function in 5 with a parameter $\beta$. The gain function has the following definition.

$$g(\beta,x) = e^{2\beta f_o(x-x_1)} \tag{1}$$

where x is depth into the tissue. The initial value of $\beta$ can be zero or an estimated value close to the attenuation coefficient of the tissue. The resultant echo signals are then full-wave rectified and low-pass filtered by 6. The peaks of the resulting envelope are detected and digitized by 7. The required sampling rate of A/D conversion is determined by the frequency of occurrence of the peaks, and therefore is much lower than $f_o$. The digitized envelope peaks are further corrected for diffraction by a look-up table 8. The effects of diffraction are determined for each particular type of transducer using a calibration procedure in which the amplitude of backscatter from selected reflectors (for instance, tissue equivalent phantom material) is measured as a function of distance from the transducer. This procedure results in a series of numbers which can be used to correct the beam spreading or focusing effect of the transducer.

The noise-to-signal ratio (NSR) of the corrected peaks of the A-scan lines is calculated by 9 accordinq to the following equation:

$$NSR = \frac{\sqrt{N \sum_{i=1}^{N} R_i^2 - \left(\sum_{i=1}^{N} R_i\right)^2}}{\sum_{i=1}^{N} R_i}, \quad (2)$$

where R is the magnitude of the envelope peak i and N is the total number of the peaks.

Figure 3C:
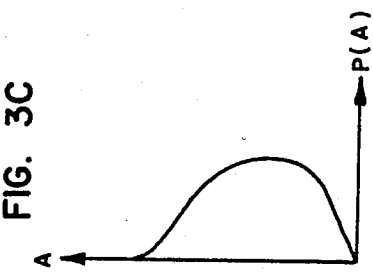
FIGS. 3A, 3B and 3C show original original RF waveforms pertinent to the operation of the invention.
Figure 3A:
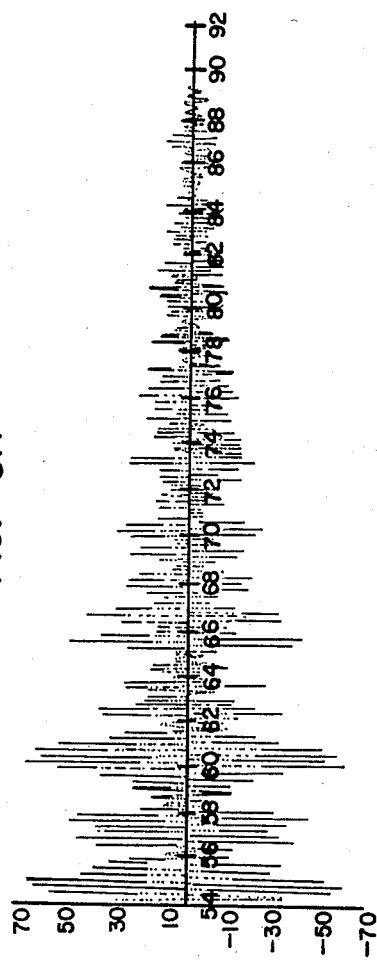
Figure 3B:
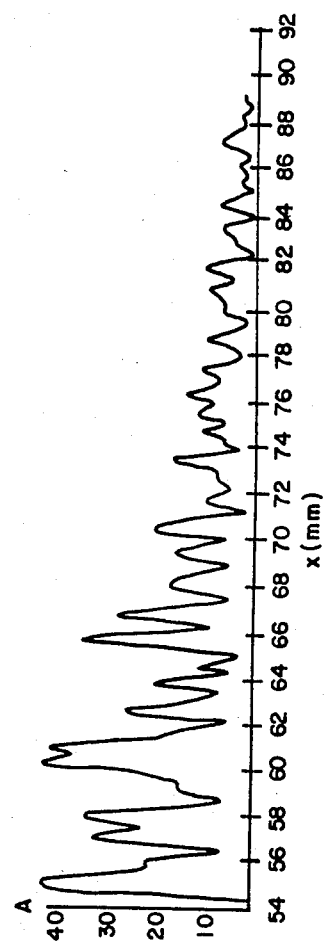

FIGS. 3 and 4 show pertinent waveforms illustrating the operation of the invention. In FIG. 3A, waveform 31 represents a typical A-line or time response signal representing the received signals from the transducer 2. Waveform 31 is plotted as amplitude on the vertical scale, and depth x within the body on the horizontal scale. Waveform 32 of FIG. B is the detected envelope signal corresponding to waveform 31, and is also plotted as amplitude on the same horizontal depth scale. Curve 33 of FIG. 3C schematically shows the distribution of the number of peaks P(A) versus amplitude A of the signal 32.

Figure 4C:
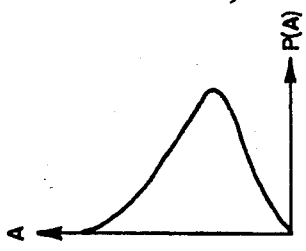
FIGS. 4A, 4B and 4C show pertinent waveforms after gain compensation and noise-to-signal ratio minimization according to the present invention.
Figure 4A:
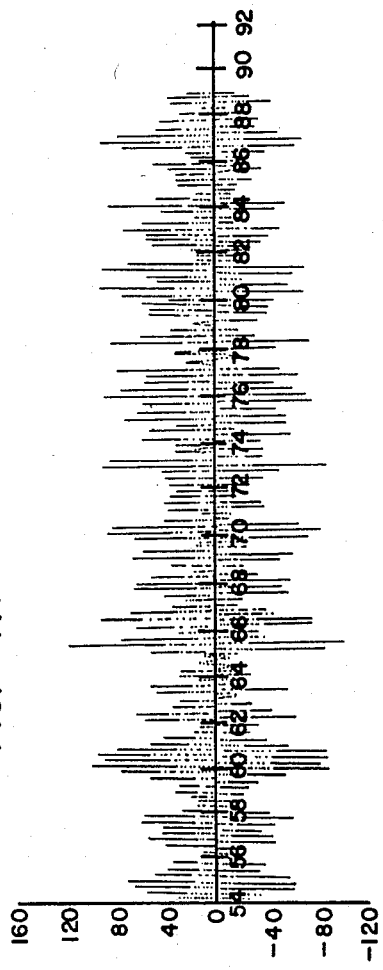
Figure 4B:
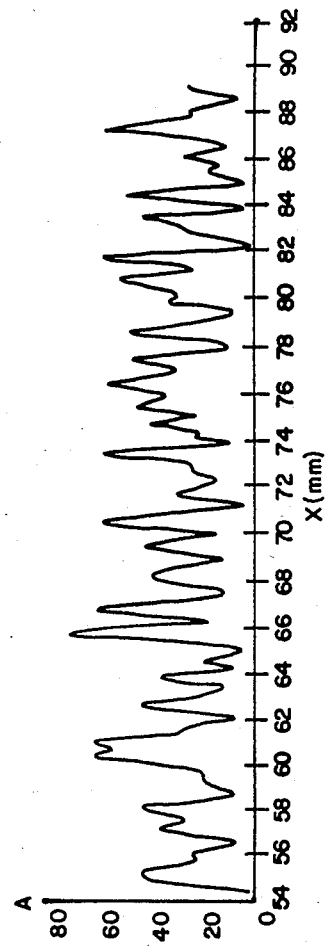

The amplitude of the received signal 31 decreases with time because of attenuation of the signal with depth in the tissue. This results in a relatively broad distribution of peaks 33 as compared with distribution 43 shown in FIG. 4C. In FIG. 4C, a correct value for the parameter $\beta$ in the exponential gain function, equation (1) has been applied in variable gain element 5 of FIG. 1, with the result that the received time response signal 41 does not show attenuation in depth as did FIG. 3. Similarly, the detected envelope signal 42 of FIG. 4B and derived from waveform 41 of FIG. 4A does not show attenuation. As a result, the distribution of peaks 43 in FIG. 4C is much narrower when the correct $\beta$ is used in equation 1. If the waveform 32 is over-corrected with an exponential gain function, the distribution of peaks will broaden again. Equation 2 results in a normalized measure of the "broadness" of the peak distribution and when minimized indicates that the correct value of $\beta$ has been used in equation 1.

The automated method for finding the correct $\beta$ in the system of FIG. 1 is as follows. The parameter $\beta$ in the gain function 5 is increased by a small step. A new signal is transmitted and received and the whole process is performed again, and a new NSR is obtained. If the new NSR is smaller than the previous one, the parameter $\beta$ is increased again. The process is stopped when the NSR starts to increase. The minimum NSR and the corresponding $\beta$ value are then provided by 10. The minimum NSR is used to indicate the heterogeneity of the tissue scatterers and the corresponding $\beta$ is the attenuation coefficient of the tissue. This $\beta$ is also used to control the postprocessing 11 to produce an improved B-scan image 12 with an optimal time-variable gain compensation adjusted according to the attenuation properties of the tissue.

Figure 2:
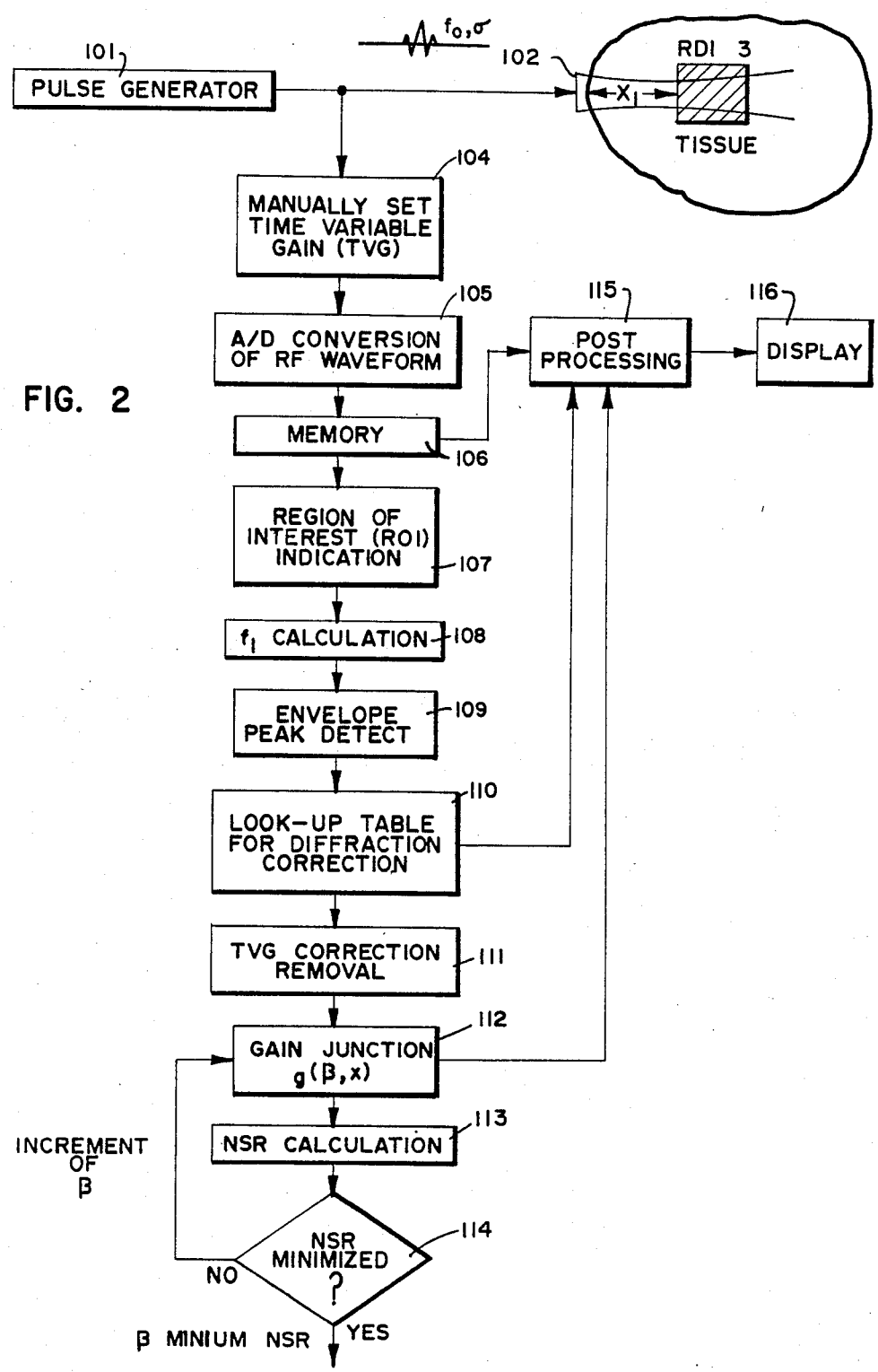
FIG. 2 is a block diagram of another embodiment of the invention in which a broadband ultrasound signal is used and fast postprocessing is used to determine the tissue characteristics.

FIG. 2 shows an alternative embodiment of the invention. This design uses a broadband pulse and the main part of the signal processing is done on the data digitized and stored from a single sweep of the ultrasound beam. A pulse with central frequency $f_o$ and bandwidth $\sigma$ is generated by 101, and transmitted and received by transducer 102. The received echoes are compensated by a time-variable gain compensation 104 that has been set by visually optimizing the image appearance on display 116. This gain compensation is not designed for optimal compensation but just for enhancing the signal backscattered from the remote parts of the tissue to a level above the noise level. The echo signals are then digitized by 105 and stored in memory 106. The region of interest (ROI) 3 is determined by 107. The central frequency $f_1$ of the echo signals backscattered from the tissue at the distance $x_1$ is determined by 108 which uses standard fast Fourier transform methods. Once again the envelopes of the echo signals are generated and the peaks of the envelopes are detected by 109. The effects of diffraction caused by beam shape are once again corrected at this stage by a look-up table 110 and the effects of the manually-set time-variable gain compensation (TVG) are removed by 111. This requires that the TVG selected by the operator to visually optimize the image must be a calibrated function that is input to the processor 111 for correction of the digitized signals. The processed envelope peaks are then multipled by a time-varying gain function g in 112 with parameter $\beta$. The gain function g, which takes into account the down shift of the central frequency of the echo signals due to the attenuation, is defined by the following equation:

$$g(\beta,x) = e^{2\beta[f_1 - 2\beta\sigma^2(x-x_1)](x-x_1)}.$$

As in the embodiment of FIG. 1, the initial $\beta$ can be set to zero or an estimated value. The NSR of the modified peaks is calculated by 113 and the $\beta$ is increased by a small step and is calculated from the new peak values. However, in this design the automatic selection of the correct $\beta$ is done on the digitized data obtained from a single sweep of the ultrasonic beam. As in the embodiment of FIG. 1, the process is stopped when the NSR is minimized and the minimum NSR and the corresponding are provided by 114. The $\beta$ corresponding to the minimum NSR is also used to control the postprocessing 115 to produce an improved display of the B-scan image 116.

In both designs, various minimization methods can be applied to speed up the approach to the minimum NSR.

In both designs, the final B-scan image may be reconstructed using the compensated envelope peaks which have minimum NSR.

It will thus be appreciated that the present invention provides an improved system and method for ultrasonic sampling and for automatically and accurately determining attenuation and a statistical measure of heterogeneity of scattering for the tissue sample of interest, which data can be used for characterizing the type or condition of the tissue.

While the invention has been described in terms of a medical instrument for measurement and characterization of body tissue such as liver tissue, it will be understood that the principle and method of the invention is applicable to other types of tissues or the testing and characterizing of other types of materials.

What is claimed is:

1. A method of tissue characterization by ultrasonic measurement, comprising:
    (a) transmitting ultrasonic energy into a tissue sample;
    (b) receiving return echo signals corresponding to a sample region to be measured;
    (c) applying a depth or time variable gain function to the received signals;
    (d) detecting peaks of the received signals;
    (e) determining the statistical distribution of amplitudes of the detected peaks;

(f) repeating at least some of steps (a)–(e) with a modified value of the gain function to determine the minimum spread of the distribution of peak amplitudes; and (g) providing the value of the gain function associated with said minimum spread as a measure of attenuation in the sample, and providing a measurement of said minimum spread of the peak distribution as a measure of the homogeneity of the sample.

2. Apparatus for tissue characterization, comprising:

pulse generating means for providing ultrasound signals;

transducer means and means connecting it to said pulse generating means for transmission of ultrasound signals into a sample, and for receiving return signals from the sample;

signal detecting means for generating the envelopes of the received ultrasound signals and detecting peaks thereof;

a controllable time-variable gain compensating means operable for modifying said received ultrasound signals or digitized peak values thereof;

calculation means operative for calculating the noise-to-signal ratio of said peaks and for providing an output representative thereof; and means coupled to said calculating means for altering said gain compensating means in response to the calculated noise-to-signal ratio to provide a minimum noise-to-signal ratio.

3. Apparatus according to claim 2 further including means coupled to said detecting means for correcting for the effects of beam pattern diffraction.

4. Apparatus according to claim 2, wherein said transducer means comprises a mechanical sector scanning probe.

5. Apparatus according to claim 2, wherein said transducer means comprises phased array transducers.

6. Apparatus according to claim 2, wherein said pulse generating means is operable to provide a broadband pulse signal.

7. Apparatus according to claim 6 further including means coupled to said detecting means for determining the central frequency of the received signal backscattered from the start depth of the region of interest.

8. Apparatus according to claim 7 wherein said means for determining the central frequency includes a zero-crossing detecting means.

9. Apparatus according to claim 7, wherein said means for determining the central frequency includes a fast Fourier transform analyzer means.

10. Apparatus according to claim 2, wherein said pulse generating means is operative to provide a tone-burst signal.

11. An apparatus for scan imaging with an automatically adjustable time-variable gain compensation based on the minimization of the noise-to-signal ratio of the echo envelope peaks comprising:

pulse generating means for providing a broadband pulse signal;

scanning transducer means for trasnmitting and receiving said ultrasound signals and for providing scan image signals;

means coupled to said transducer means to generate the envelope of said received ultrasound signals and to detect peaks of said envelopes and to provide output signals related thereto;

means coupled to said transducer means for providing time-variable gain compensation to modify one of said received signals or said peak value related signals;

means for calculating the noise-to-signal ratio of said envelope peak signals;

means coupled to said time-variable gain compensating means for minimizing said noise-to-signal ratio by gradually changing the parameter of said controllable time-variable gain compensating means; and graphic display means coupled to said sector scanning transducer means for receiving said scan image signals and providing a display thereof.

12. Apparatus according to claim 11, wherein said scanning transducer means comprises a mechanical sector scanning probe.

13. Apparatus according to claim 11, wherein said scanning transducer means comprises phased array transducers.

14. Apparatus according to claim 11 further including means for reconstructing a B-scan image using the compensated envelope peaks which have minimum noise-to-signal ratio.

* * * * *